United States Patent
Enomoto

(10) Patent No.: US 6,829,100 B2
(45) Date of Patent: Dec. 7, 2004

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/721,901

(22) Filed: Nov. 26, 2003

(65) Prior Publication Data

US 2004/0105166 A1 Jun. 3, 2004

(30) Foreign Application Priority Data

Nov. 29, 2002 (JP) ........................................ 2002-348570

(51) Int. Cl.$^7$ ............................................. G02C 15/14
(52) U.S. Cl. ...................................................... 359/686
(58) Field of Search ................................ 359/683, 686

(56) References Cited

U.S. PATENT DOCUMENTS

| | | | |
|---|---|---|---|
| 4,978,204 A | 12/1990 | Ito | |
| 5,455,714 A | 10/1995 | Kohno | |
| 6,002,529 A | 12/1999 | Kohno et al. | |
| 6,369,955 B1 | 4/2002 | Enomoto et al. | |
| 6,639,721 B2 * | 10/2003 | Endo | 359/566 |
| 6,657,792 B2 | 12/2003 | Eguchi et al. | |
| 2003/0231405 A1 | 12/2003 | Enomoto | |

FOREIGN PATENT DOCUMENTS

| | | |
|---|---|---|
| JP | 2-256015 | 10/1990 |
| JP | 6-265788 | 9/1994 |
| JP | 2000-180725 | 6/2000 |
| JP | 2002-350728 | 12/2002 |

* cited by examiner

Primary Examiner—Scott J. Sugarman
(74) Attorney, Agent, or Firm—Greenblum & Bernstein, P.L.C.

(57) ABSTRACT

A zoom lens system includes a positive first lens group, a negative second lens group, a positive third lens group, and a negative fourth lens group.

Zooming is performed by moving each of the positive first through the negative fourth lens groups along the optical axis.

The zoom lens system satisfies the following condition:

$$0.35 < (f_{23T}/f_{23W})/(f_T/f_W) < 0.55 \qquad (1)$$

wherein $f_{23T}$ designates the combined focal length of the negative second lens and the positive third lens groups at the long focal length extremity;

$f_{23W}$ designates the combined focal length of the negative second lens and the positive third lens groups at the short focal length extremity;

$f_T$ designates the focal length of the entire the zoom lens system at the long focal length extremity; and $f_W$ designates the focal length of the entire the zoom lens system at the short focal length extremity.

7 Claims, 10 Drawing Sheets

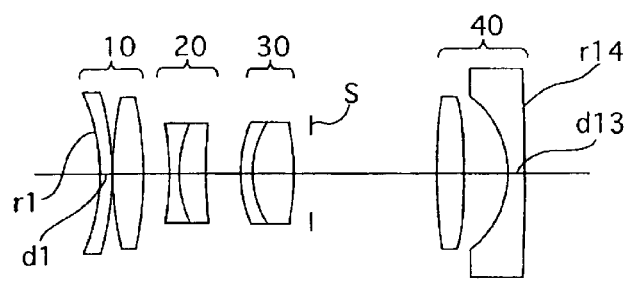

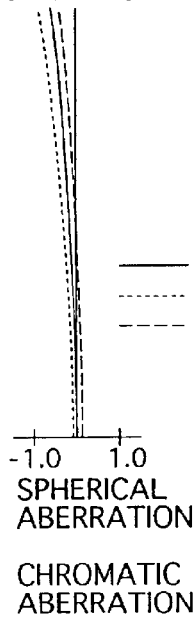
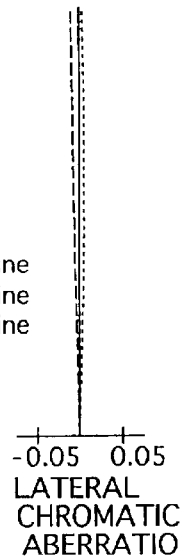
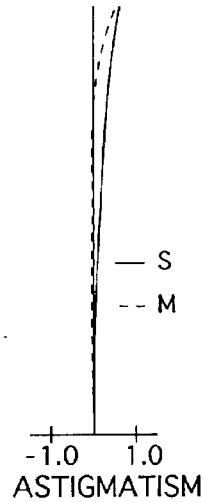
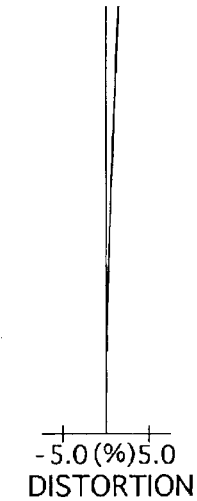
Fig. 3A
F$_{NO.}$= 1: 10.6
Fig. 3B
W=13.3°
Fig. 3C
W=13.3°
Fig. 3D
W=13.3°
—— d Line
········ g Line
– – – C Line
—— S
– – M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0 (%) 5.0
DISTORTION
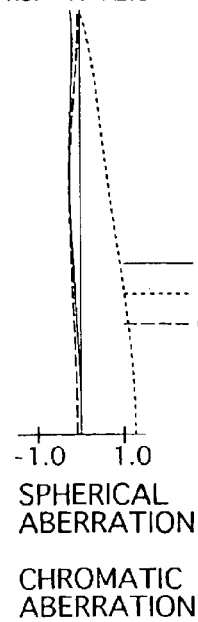
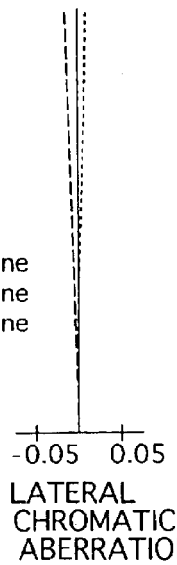
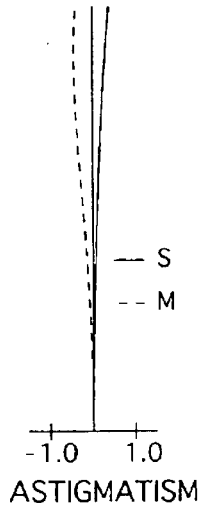
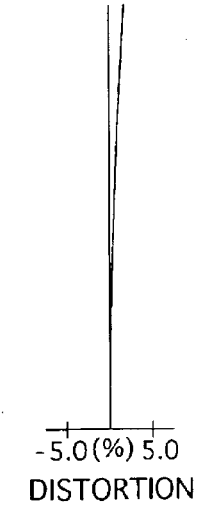
Fig. 4A
F$_{NO.}$= 1: 12.5
Fig. 4B
W=8.8°
Fig. 4C
W=8.8°
Fig. 4D
W=8.8°
—— d Line
········ g Line
– – – C Line
—— S
– – M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0 (%) 5.0
DISTORTION FNO.=1 : 9.0
— d Line
······ g Line
---- C Line
-1.0  1.0
SPHERICAL
ABERRATION
CHROMATIC
ABERRATION

W=16.9°
-0.05  0.05
LATERAL
CHROMATIC
ABERRATION

W=16.9°
— S
-- M
-1.0  1.0
ASTIGMATISM

W=16.9°
-5.0(%)5.0
DISTORTION

FNO.=1 : 10.3
— d Line
······ g Line
---- C Line
-1.0  1.0
SPHERICAL
ABERRATION
CHROMATIC
ABERRATION

W=10.8°
-0.05  0.05
LATERAL
CHROMATIC
ABERRATION

W=10.8°
— S
-- M
-1.0  1.0
ASTIGMATISM

W=10.8°
-5.0(%)5.0
DISTORTION

FNO.= 1: 5.8

-1.0  1.0
SPHERICAL
ABERRATION
CHROMATIC
ABERRATION

W=28.5°

-0.05  0.05
LATERAL
CHROMATIC
ABERRATION

W=28.5°

-1.0  1.0
ASTIGMATISM

W=28.5°

-5.0(%) 5.0
DISTORTION

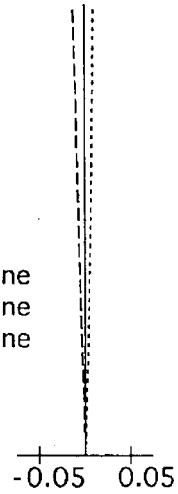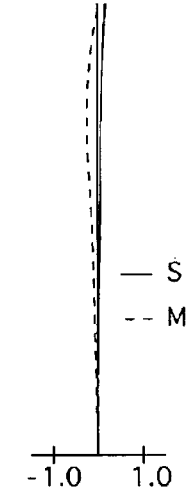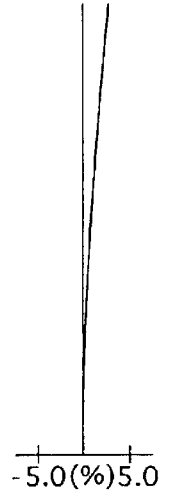
Fig. 9A  Fig. 9B  Fig. 9C  Fig. 9D
FNO.= 1:9.9   W=13.2°   W=13.2°   W=13.2°
— d Line
······ g Line
---- C Line
— S
-- M
-1.0  1.0    -0.05  0.05    -1.0  1.0    -5.0(%)5.0
SPHERICAL   LATERAL      ASTIGMATISM   DISTORTION
ABERRATION  CHROMATIC
            ABERRATION
CHROMATIC
ABERRATION
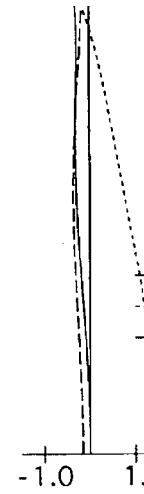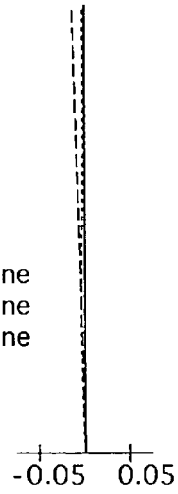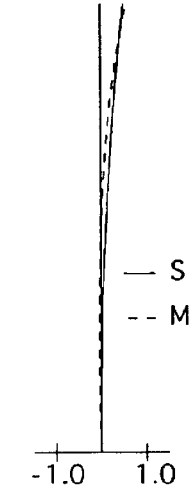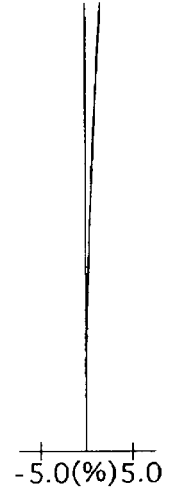
Fig.10A  Fig.10B  Fig.10C  Fig.10D
FNO.= 1:12.8   W=8.6°   W=8.6°   W=8.6°
— d Line
······ g Line
---- C Line
— S
-- M
-1.0  1.0    -0.05  0.05    -1.0  1.0    -5.0(%)5.0
SPHERICAL   LATERAL      ASTIGMATISM   DISTORTION
ABERRATION  CHROMATIC
            ABERRATION
CHROMATIC
ABERRATION

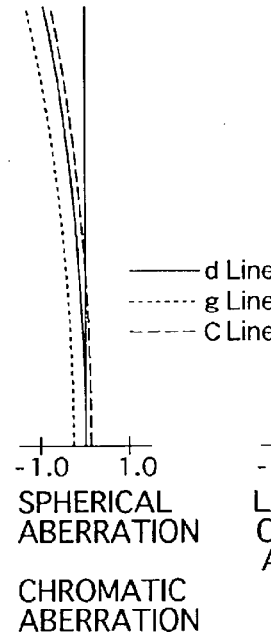
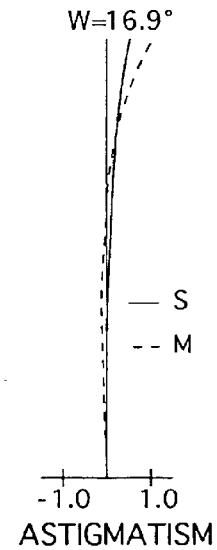
Fig.11A  FNO.=1: 9.5
SPHERICAL ABERRATION
CHROMATIC ABERRATION
— d Line
······ g Line
---- C Line
Fig.11B  W=16.9°
LATERAL CHROMATIC ABERRATION
Fig.11C  W=16.9°
ASTIGMATISM
— S
-- M
Fig.11D  W=16.9°
DISTORTION
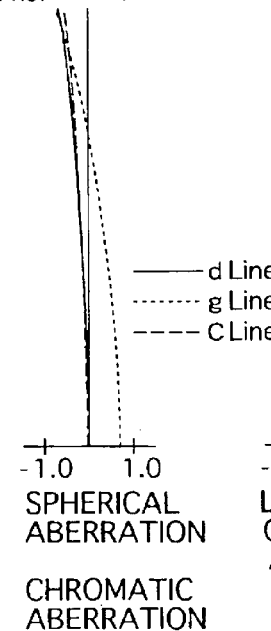
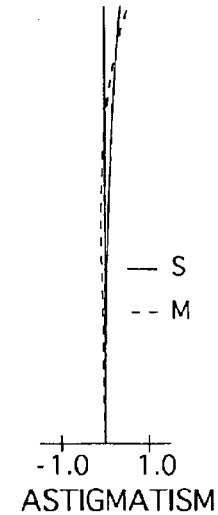
Fig.12A  FNO.=1: 10.4
SPHERICAL ABERRATION
CHROMATIC ABERRATION
— d Line
······ g Line
---- C Line
Fig.12B  W=10.9°
LATERAL CHROMATIC ABERRATION
Fig.12C  W=10.9°
ASTIGMATISM
— S
-- M
Fig.12D  W=10.9°
DISTORTION Fig. 13
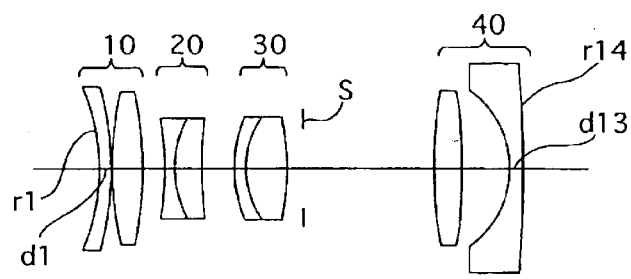
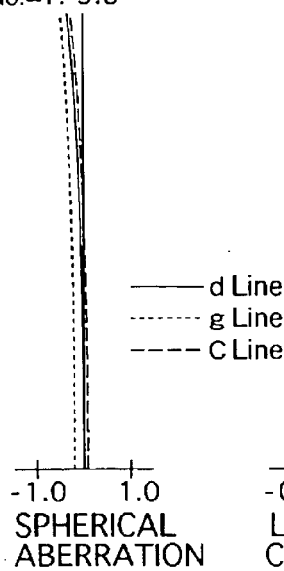
Fig.14A
FNO.=1: 5.8
-1.0  1.0
SPHERICAL
ABERRATION
CHROMATIC
ABERRATION
—— d Line
······ g Line
---- C Line
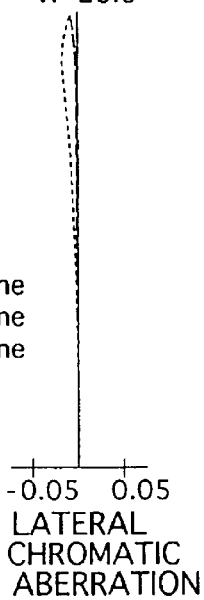
Fig.14B
W=28.5°
-0.05  0.05
LATERAL
CHROMATIC
ABERRATION
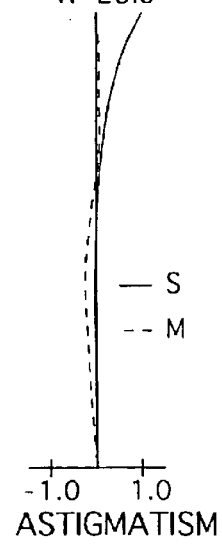
Fig.14C
W=28.5°
-1.0  1.0
ASTIGMATISM
—— S
-- M
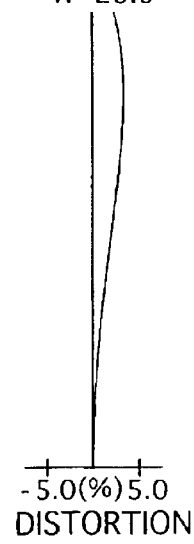
Fig.14D
W=28.5°
-5.0(%) 5.0
DISTORTION Fig.15A
FNO.= 1: 9.5
Fig.15B
W=13.3°
Fig.15C
W=13.3°
Fig.15D
W=13.3°
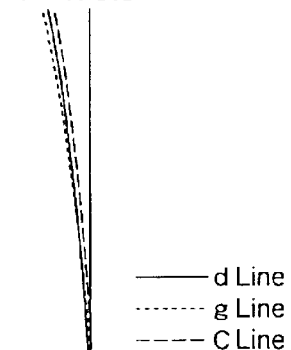
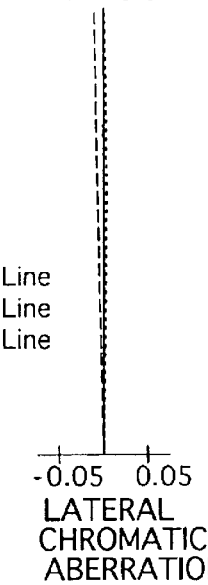
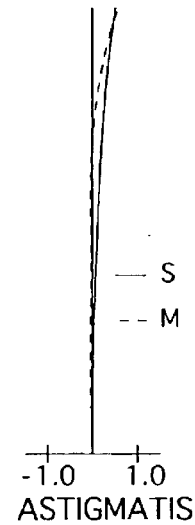
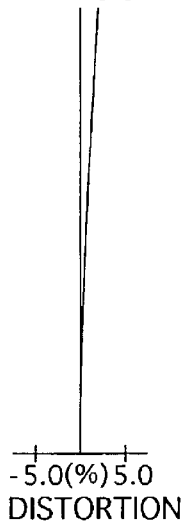
—— d Line
······ g Line
---- C Line
— S
-- M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0(%)5.0
DISTORTION
Fig.16A
FNO.= 1: 12.5
Fig.16B
W=8.8°
Fig.16C
W=8.8°
Fig.16D
W=8.8°
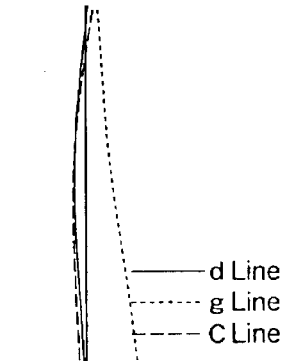
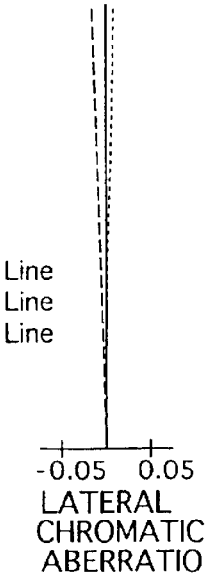
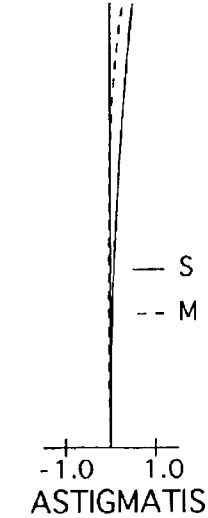
—— d Line
······ g Line
---- C Line
— S
-- M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0(%)5.0
DISTORTION

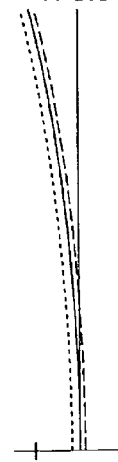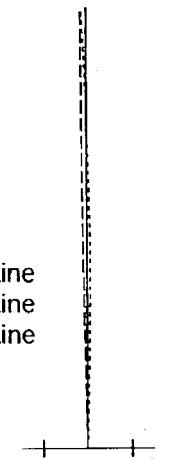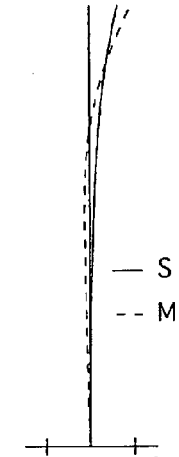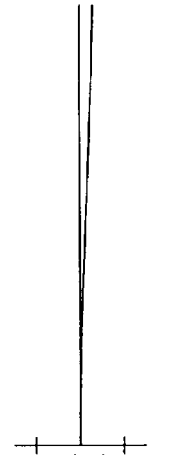
Fig.17A  Fig.17B  Fig.17C  Fig.17D
FNO.=1: 8.0  W=16.9°  W=16.9°  W=16.9°
SPHERICAL ABERRATION  LATERAL CHROMATIC ABERRATION  ASTIGMATISM  DISTORTION
CHROMATIC ABERRATION
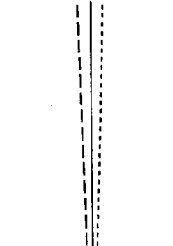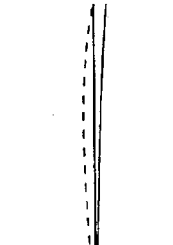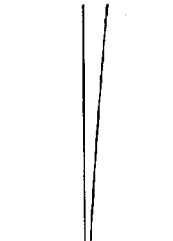
Fig.18A  Fig.18B  Fig.18C  Fig.18D
FNO.=1: 10.4  W=10.8°  W=10.8°  W=10.8°
SPHERICAL ABERRATION  LATERAL CHROMATIC ABERRATION  ASTIGMATISM  DISTORTION
CHROMATIC ABERRATION

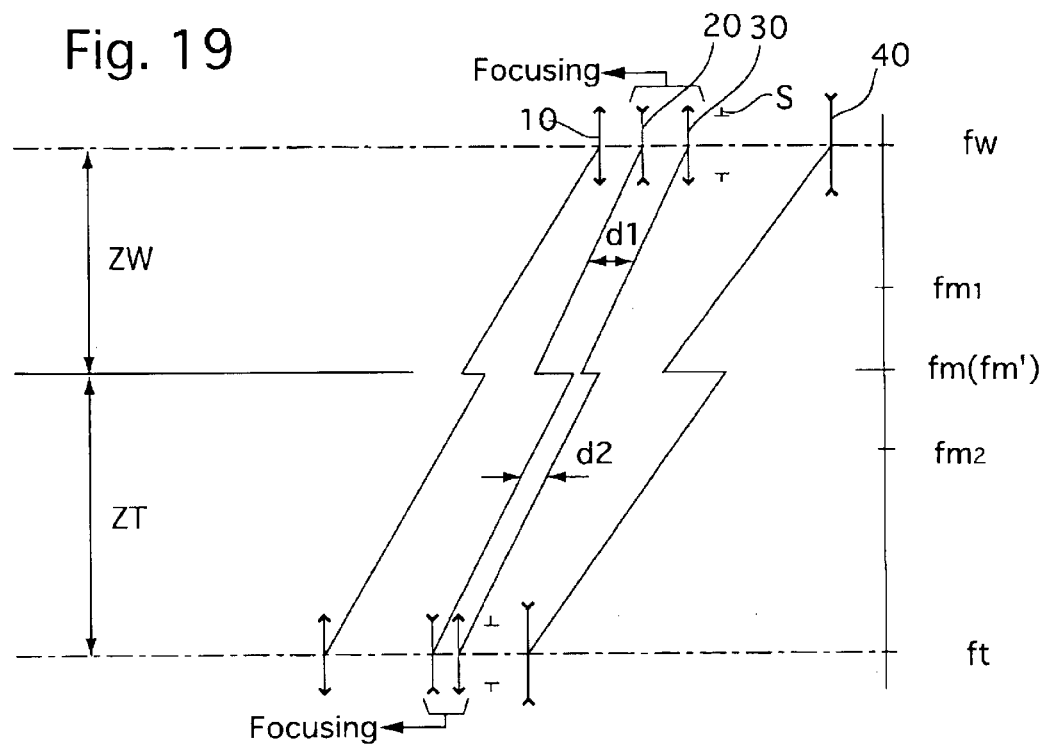
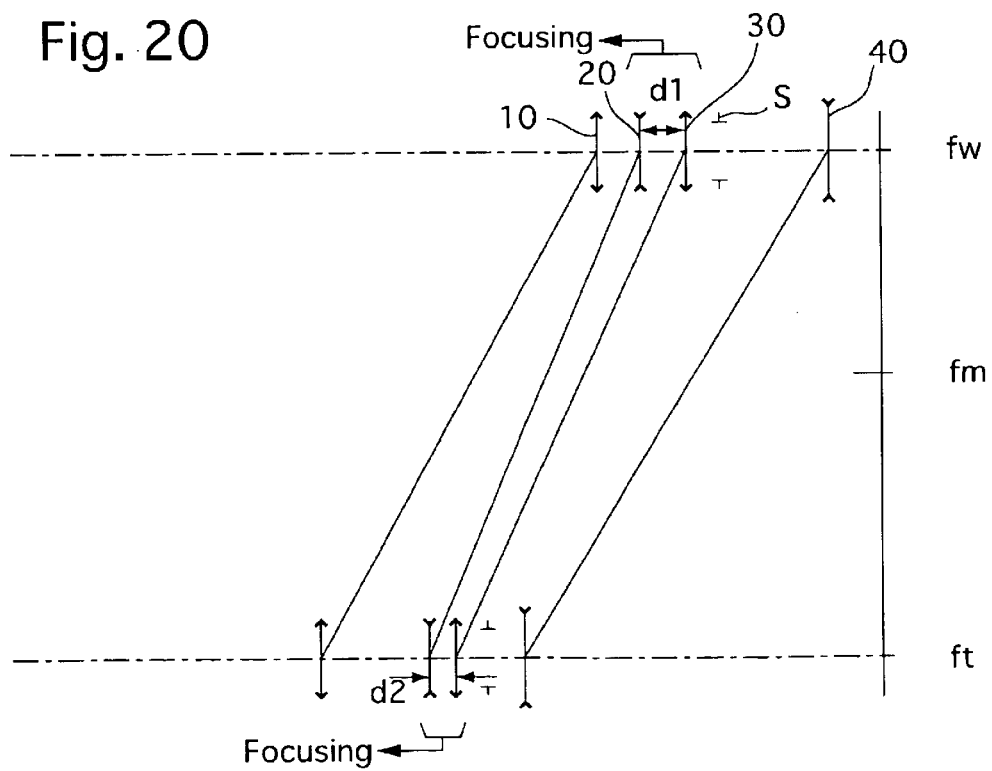

ZOOM LENS SYSTEM

BACKGROUND OF THE INVENTION

1. Field of the Invention

The present invention relates to a zoom lens system for photographic camera, and in particular, relates to a zoom lens system for a lens-shutter camera.

2. Description of the Prior Art

Unlike a zoom lens system of a single lens reflex (SLR) camera which requires space to accommodate a quick-return mirror behind the photographing lens system, a zoom lens system of a compact camera does not require a long back focal distance. As an example of such a zoom lens system of a compact camera having few constrains on the back focal distance, a zoom lens system of a three-lens-group arrangement, i.e., a positive lens group, another positive lens group, and a negative lens group, in this order from the object, has been proposed (e.g., Japanese Unexamined Patent Publication No. Hei-2-256015). However, if an attempt is made to further increase the zoom ratio in such a zoom lens system mentioned above, the overall length of the zoom lens system becomes longer at the long focal length extremity.

Furthermore, for the purpose of achieving further miniaturization and a higher zoom ratio, a zoom lens system of a four-lens-group arrangement, i.e., a positive lens group, a negative lens group, a positive lens group and a negative lens group, in this order from the object, has been proposed (e.g., Japanese Unexamined Patent Publications No. Hei-6-265788 and No. 2000-180725). However, in such a lens arrangement, the traveling distances of the lens groups thereof are longer, so that the overall length of the zoom lens system at the long focal length extremity becomes longer; and the entrance pupil position becomes distant at the short focal length extremity, so that the frontmost lens diameter becomes larger. Consequently, further miniaturization cannot be achieved.

SUMMARY OF THE INVENTION

The present invention provides a zoom lens system, for a lens-shutter compact camera with a retractable lens barrel, having a zoom ratio Z ($=f_T/f_W$) of more than 3.5.

According to the present invention, there is provided a zoom lens system including a first lens group having a positive refractive power (hereinafter, positive first lens group), a second lens group having a negative refractive power (hereinafter, negative second lens group), a third lens group having a positive refractive power (hereinafter, positive third lens group), and a fourth lens group having a negative refractive power (hereinafter, negative fourth lens group), in this order from the object.

Zooming is performed by moving each of the positive first through the negative fourth lens groups along the optical axis.

The zoom lens system satisfies the following condition:

$$0.35 < (f_{23T}/f_{23W})/(f_T/f_W) < 0.55 \quad (1)$$

wherein $f_{23T}$ designates the combined focal length of the negative second lens group and the positive third lens group at the long focal length extremity;

$f_{23W}$ designates the combined focal length of the negative second lens group and the positive third lens group at the short focal length extremity;

$f_T$ designates the focal length of the entire the zoom lens system at the long focal length extremity; and $f_W$ designates the focal length of the entire the zoom lens system at the short focal length extremity.

The zoom lens system preferably satisfies the following condition:

$$0.05 < (D_{23W} - D_{23T})/f_W < 0.2 \quad (2)$$

wherein $D_{23W}$ designates the axial distance between the negative second lens group and the positive third lens group at the short focal length extremity;

$D_{23T}$ designates the axial distance between the negative second and the positive third lens group at the long focal length extremity; and $f_W$ designates the focal length of the entire the zoom lens system at the short focal length extremity.

The zoom lens system can satisfy the following condition:

$$0.5 < f_W/f_{1G} < 0.7 \quad (3)$$

wherein $f_W$ designates the focal length of the entire the zoom lens system at the short focal length extremity; and $f_{1G}$ designates the focal length of the positive first lens group.

The zoom lens system preferably satisfies the following condition:

$$12 \text{ mm} < f_{4G}(m_{4T} - m_{4W})/(f_T/f_W) < 14 \text{ mm} \quad (4)$$

wherein $f_{4G}$ designates the focal length of the negative fourth lens group;

$m_{4T}$ designates the magnification of the negative fourth lens group when an object at an infinite distance is in an in-focus state at the long focal length extremity;

$m_{4W}$ designates the magnification of the negative fourth lens group when an object at an infinite distance is in an in-focus state at the short focal length extremity;

$f_T$ designates the focal length of the entire the zoom lens system at the long focal length extremity; and $f_W$ designates the focal length of the entire the zoom lens system at the short focal length extremity.

The zoom lens system of the present invention can be applied to a zoom lens system in which (i) the negative second lens group and the positive third lens group are arranged to maintain a predetermined distance d1 in a short-focal-length side zooming range which is defined between the short focal length extremity and a first (before switching) intermediate focal length, and to maintain another predetermined distance d2, which is smaller than the predetermined distance d1, in a long-focal-length side zooming range which is defined between a second (after switching) intermediate focal length and the long focal length extremity; (ii) at the first (before switching) intermediate focal length, all the lens groups are moved toward an image to the second (after switching) intermediate focal length; and (iii) the zoom lens system preferably satisfies the following condition:

$$12 \text{ mm} < (X_{4W} + X_{4T} - \Delta X_{4MM^*})/(f_T/f_W) < 14 \text{ mm} \quad (5)$$

wherein $X_{4W} = f_{4G}(m_{4M} - m_{4W})$;
$X_{4T} = f_{4G}(m_{4T} - m_{4M^*})$;
$\Delta X_{4MM^*} = f_{4G}(m_{4T} - m_{4M^*})$;

$m_{4M} = fm/f_{123M}$;
$m_{4W} = f_W/f_{123W}$;
$m_{4T} = f_T/f_{123T}$;
$m_{4M^*} = fm'/f_{123M^*}$;

fm designates the first intermediate focal length;

fm' designates the second intermediate focal length;

$f_{123W}$ designates the combined focal length of the positive first lens group, the negative second lens group and the positive third lens group at the short focal length extremity;

$f_{123M}$ designates the combined focal length of the positive first lens group, the negative second lens group and the positive third lens group at the first (before switching) intermediate focal length in the short-focal-length side zooming range;

$f_{123M^*}$ designates the combined focal length of the positive first lens group, the negative second lens group and the positive third lens group at the second (after switching) intermediate focal length in the long-focal-length side zooming range;

$f_{123T}$ designates the combined focal length of the positive first lens group, the negative second lens group and the positive third lens group at the long focal length extremity;

$f_T$ designates the focal length of the entire the zoom lens system at the long focal length extremity; and $f_W$ designates the focal length of the entire the zoom lens system at the short focal length extremity.

In the zoom lens system, the positive third lens group preferably includes at least one aspherical surface which satisfies the following condition:

$$-30 < \Delta I_{ASP} < -10 \quad (6)$$

wherein $\Delta I_{ASP}$ designates the amount of change of the spherical aberration coefficient due to the aspherical surface in the positive third lens group under the condition that the focal length at the short focal length extremity is converted to 1.0.

In the zoom lens system, the negative fourth lens group preferably includes at least one aspherical surface which satisfies the following condition:

$$0 < \Delta V_{ASP} < 3 \quad (7)$$

wherein $\Delta V_{ASP}$ designates the amount of change of the distortion coefficient due to the aspherical surface in the negative fourth lens group under the condition that the focal length at the short focal length extremity is converted to 1.0.

The present disclosure relates to subject matter contained in Japanese Patent Application No.2002-348570 (filed on Nov. 29, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system according to a first embodiment of the present invention;

FIGS. 2A, 2B, 2C and 2D show aberrations occurred in the zoom lens system shown in FIG. 1 at the short focal length extremity;

FIGS. 3A, 3B, 3C and 3D show aberrations occurred in the zoom lens system shown in FIG. 1 at the intermediate focal length when the lens groups are moved along the lens-group moving paths shown in FIG. 20;

FIGS. 4A, 4B, 4C and 4D show aberrations occurred in the zoom lens system shown in FIG. 1 at the long focal length extremity;

FIGS. 9A, 9B, 9C, and 9D show aberrations occurred in the zoom lens system shown in FIG. 7 at the intermediate focal length when the lens groups are moved along the lens-group moving paths shown in FIG. 20;

FIGS. 10A, 10B, 10C and 10D show aberrations occurred in the zoom lens system shown in FIG. 7 at the long focal length extremity;

FIGS. 11A, 11B, 11C and 11D show aberrations occurred in the zoom lens system shown in FIG. 7 at the first (before switching) intermediate focal length in the short-focal-length side zooming range when the lens groups are moved along the lens-group moving paths shown in FIG. 19;

FIGS. 12A, 12B, 12C and 12D show aberrations occurred in the zoom lens system shown in FIG. 7 at the second (after switching) intermediate focal length in the long-focal-length side zooming range when the lens groups are moved along the lens-group moving paths shown in FIG. 19;

FIG. 13 is a lens arrangement of the zoom lens system according to a third embodiment of the present invention;

FIGS. 14A, 14B, 14C and 14D show aberrations occurred in the zoom lens system shown in FIG. 13 at the short focal length extremity;

FIGS. 15A, 15B, 15C and 15D show aberrations occurred in the zoom lens system shown in FIG. 13 at the intermediate focal length when the lens groups are moved along the lens-group moving paths shown in FIG. 20;

FIGS. 16A, 16B, 16C and 16D show aberrations occurred in the zoom lens system shown in FIG. 13 at the long focal length extremity;

FIGS. 17A, 17B, 17C and 17D show aberrations occurred in the zoom lens system shown in FIG. 13 at the first (before switching) intermediate focal length in the short-focal-length side zooming range when the lens groups are moved along the lens-group moving paths shown in FIG. 19;

FIGS. 18A, 18B, 18C and 18D show aberrations occurred in the zoom lens system shown in FIG. 13 at the second (after switching) intermediate focal length in the long-focal-length side zooming range when the lens groups are moved along the lens-group moving paths shown in FIG. 19;

FIG. 19 is the schematic view of the lens-group moving paths, with the switching movement of the lens groups, for the zoom lens system according to the present invention; and FIG. 20 is another schematic view of the lens-group moving paths, without the switching movement of the lens groups, for the zoom lens system according to the present invention.

DESCRIPTION OF THE PREFERRED EMBODIMENTS

Figure 5A:
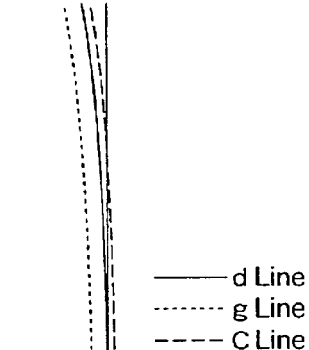
FIGS. 5A, 5B, 5C and 5D show aberrations occurred in the zoom lens system shown in FIG. 1 at the first (before switching) intermediate focal length in the short-focal-length side zooming range when the lens groups are moved along the lens-group moving paths shown in FIG. 19.
Figure 5B:
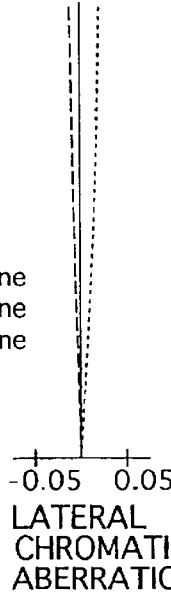
Figure 5C:
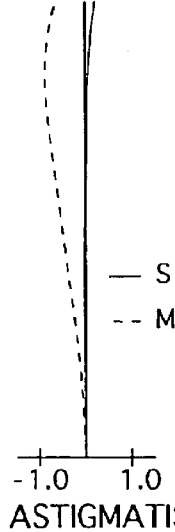
Figure 5D:
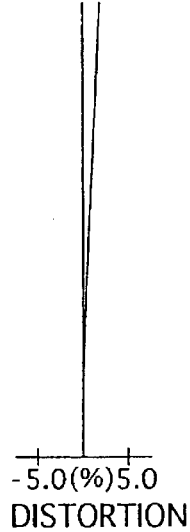
Figure 6A:
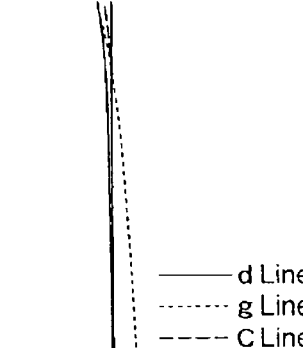
FIGS. 6A, 6B, 6C and 6D show aberrations occurred in the zoom lens system shown in FIG. 1 at the second (after switching) intermediate focal length in the long-focal-length side zooming range when the lens groups are moved along the lens-group moving paths shown in FIG. 19.
Figure 6B:
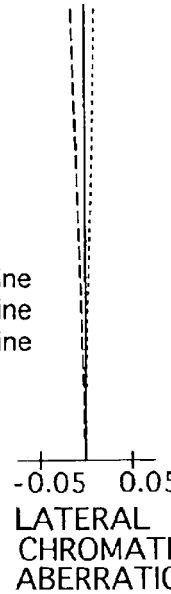
Figure 6C:
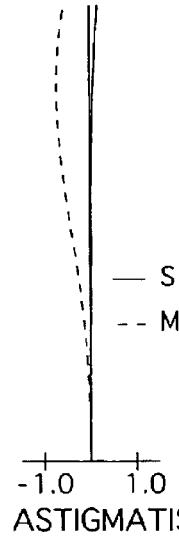
Figure 6D:
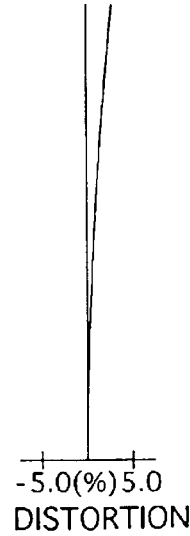

As shown in the lens-group moving paths of FIGS. 19 and 20, the four-lens-group zoom lens system for a compact camera includes a positive first lens group 10, a negative second lens group 20, a positive third lens group 30, and a negative fourth lens-group 40, in this order from the object; and zooming is performed by moving the first through fourth lens groups in the optical axis direction. A diaphragm S is provided between the positive third lens group 30 and the negative fourth lens group 40, and moves together with the positive third lens group 30.

FIG. 19 is an example of the lens-group moving paths having a switching movement of the lens groups at the intermediate focal lengths. According to FIG. 19, zooming from the short focal length extremity fw toward the long focal length extremity ft, the lens groups 10 through 40 are arranged to move as follows:

In a focal-length range ZW (the first focal length range; the short-focal-length side zooming range) extending from the short focal length extremity fw to the first intermediate focal length fm, the positive first lens group 10, the negative second lens group 20, the positive third lens group 30, and the negative fourth lens group 40 are moved toward the object;

At the first intermediate focal length fm (before switching), the positive first lens group 10, the negative second lens group 20, the positive third lens group 30, and the negative fourth lens group 40 are moved towards the image plane by a predetermined distance, so that the first intermediate focal length fm is changed to the second intermediate focal length fm' (after switching);

In a focal-length range ZT (the second focal length range; the long-focal-length side zooming range) extending from the second intermediate focal length fm' to the long focal length extremity ft, the positive first lens group 10, the negative second lens group 20, the positive third lens group 30, and the negative fourth lens group 40 are moved towards the object;

In the focal-length range ZW, the negative second lens group 20 and the positive third lens group 30 maintains a predetermined distance d1 (the first state);

At the first intermediate focal length fm, the distance d1 between the negative second lens group 20 and the positive third lens group 30 is reduced; and In the focal-length range ZT, the negative second lens group 20 and the positive third lens group 30 maintain the shortened distance d2 (the second state).

The first intermediate focal length fm belongs to the first focal length range ZW.

The second intermediate focal length fm' is determined after the following movement of the lens groups is completed:

(i) the positive first lens group 10 and the negative fourth lens group 40 are moved from the positions thereof, corresponding to the first intermediate focal length fm, toward the image; and (ii) the negative second lens group 20 and the positive third lens group 30 reduce the distance therebetween, while the negative second lens group 20 and the positive third lens group 30 are respectively moved toward the image.

Upon zooming, the diaphragm S moves together with the positive third lens group 30.

The lens-group moving paths, before and after the switching movement, for the first through fourth lens groups shown in FIG. 19 are simply depicted as straight lines. It should however be noted that actual lens-group moving paths are not necessarily straight lines. Furthermore, focusing is performed by integrally moving the negative second lens group 20 the positive third lens group 30 regardless of the focal length ranges.

The lens-group moving paths have discontinuities at the first intermediate focal length fm and the second intermediate focal length fm'; however, by adequately determining the positions of the positive first lens group 10, the negative second lens group 20, the positive third lens group 30, and the negative fourth lens group 40 respectively at the short focal length extremity fw, the first intermediate focal length fm, the second intermediate focal length fm' and the long focal length extremity ft, solutions by which an image is correctly formed on the image plane can be obtained.

According to the lens-group moving paths with these solutions, the position of each lens group can be precisely controlled, compared with the lens-group moving paths of FIG. 20 to be discussed below by which the lens groups are continually moved consequently, a zoom lens system which is miniaturized and has a higher zoom ratio can be obtained.

Furthermore, positions for stopping each lens group can be determined in a stepwise manner along the lens-group moving paths of FIG. 19. In an actual mechanical arrangement of the zoom lens system, each lens group can be stopped at predetermined positions according to the above-explained stepwise manner. For example, if positions at which each lens group is to be stopped are determined by appropriately selecting positions before and after the first (second) intermediate focal length fm (fm'), i.e., not at the positions just corresponding to the first (second) intermediate focal length fm (fm'), the above discontinuities can be connected by smooth curved lines. Moreover, if a stopping position closest to the second intermediate focal length fm' in the long-focal-length side zooming range ZT is set closer to the object from a stopping position closest to the first intermediate focal length fm in the short-focal-length side zooming range ZW, precision on the movement of the lens groups can be enhanced, since a U-turn movement is prevented in actual moving paths.

FIG. 20 shows an example of the lens-group moving paths without intermediate-switching of the focal lengths. Upon zooming from the short focal length extremity toward the long focal length extremity, all the lens groups move toward the object, while the distances therebetween are varied. The diaphragm S is provided between the positive third lens group 30 and the negative fourth lens group 40, and moves together with the positive third lens group 30. The lens-group moving paths of FIG. 20 are also simply depicted as straight lines; however actual lens-group moving paths are not necessarily straight lines. Furthermore, focusing is performed by integrally moving the negative second lens group 20 and the positive third lens group 30 regardless of the focal length ranges.

Even if the lens-group moving paths of FIG. 20 are employed, the position of each lens group can be precisely controlled, so that a higher zoom ratio and further miniaturization can be achieved.

Condition (1) specifies the ratio of the combined focal length of the negative second lens group 20 and the positive third lens group 30 at the short focal length extremity to the combined focal length thereof at the long focal length extremity in order to make the zoom ratio larger. By satisfying this condition, a higher zoom ratio can be achieved.

In a four-lens-group arrangement, it is preferable that the combined focal length of the negative second lens group 20 and the positive third lens group 30 be varied adequately at the short and long focal length extremities, when an attempt is made to increase the zoom ratio, and to avoid an increase in the overall length of the zoom lens system, If $(f_{23T}/f_{23W})/(f_T/f_W)$ exceeds the upper limit of condition (1), the zooming effect of both the negative second lens group 20 and the positive third lens group 30 becomes too large. Consequently, aberrations in each lens group become larger to the extent that the correcting thereof is difficult.

If $(f_{23T}/f_{23W})/(f_T/f_W)$ exceeds the lower limit of condition (1), it becomes difficult to obtain a higher zoom ratio.

Condition (2) specifies the amount of change in the distance, upon zooming, between the negative second lens group 20 and the positive third lens group 30. By satisfying this condition, the zoom ratio can be made larger without increasing the overall length of the zoom lens system.

If $(D_{23W}-D_{23T})/f_W$ exceeds the upper limit of condition (2), the amount of change in the distance between the negative second lens group 20 and the third lens group 30 becomes larger, and the overall length of the zoom lens system becomes longer.

If $(D_{23W}-D_{23T})/f_W$ exceeds the lower limit of condition (2), the zooming effect of both the negative second lens group 20 and the positive third lens group 30 becomes smaller. Consequently, a higher zoom ratio cannot be achieved without increasing the overall length of the zoom lens system.

Condition (3) specifies the ratio of the focal length of the entire the zoom lens system at the short focal length extremity to the focal length of the positive first lens group 10 for the purpose of achieving further miniaturization. By satisfying this condition, the traveling distance of the positive first lens group 10 can be made shorter, so that the zoom lens system can be further miniaturized.

If the focal length of the positive first lens group 10 becomes shorter to the extent that $f_W/f_{1G}$ exceeds the upper limit of condition (3), aberrations occurred in the positive first lens group 10 become larger, so that the correcting of aberrations becomes difficult.

If the focal length of the positive first lens group 10 becomes longer to the extent that $f_W/f_{1G}$ exceeds the lower limit of condition (3), the traveling distance of the positive first lens group 10 becomes longer, and further miniaturization cannot be achieved.

Condition (4) specifies the traveling distance of the negative fourth lens group 40 in the case where the lens groups of the zoom lens system are arranged to move along the lens-group moving paths shown in FIG. 20. By satisfying this condition, the traveling distance of the negative fourth lens group 40 can be made shorter, and further miniaturization of the zoom lens system can be achieved.

If the traveling distance of the negative fourth lens group 40 becomes longer to the extent that $f_{4G}(m_{4T}-m_{4W})/(f_T/f_W)$ exceeds the upper limit of condition (4), further miniaturization of the zoom lens system becomes difficult.

If the traveling distance of the negative fourth lens group 40 becomes shorter to the extent that $f_{4G}(m_{4T}-m_{4W})/(f_T/f_W)$ exceeds the lower limit of condition (4), it becomes difficult to achieve a zoom ratio of about 3.5.

Condition (5) specifies the traveling distance of the negative fourth lens group 40 in the case where the lens groups of the zoom lens system are arranged to move along the lens-group moving paths, shown in FIG. 19, having a switching movement of the lens groups. By satisfying this condition, the traveling distance of the negative fourth lens group 40 can be made shorter, and further miniaturization of the zoom lens system can be achieved.

If the traveling distance of the negative fourth lens group 40 becomes longer to the extent that $(X_{4W}+X_{4T}-\Delta X_{4MM^*})/(f_T/f_W)$ exceeds the upper limit of condition (5), further miniaturization of the zoom lens system becomes difficult.

If the traveling distance of the negative fourth lens group 40 becomes shorter to the extent that $(X_{4W}+X_{4T}-\Delta X_{4MM^*})/(f_T/f_W)$ exceeds the lower limit of condition (5), it becomes difficult to achieve a zoom ratio of about 3.5.

Condition (6) specifies the amount of asphericity in the case where the positive third lens group 30 includes at least one aspherical surface. By satisfying this condition, spherical aberrations can be adequately corrected.

If the amount of asphericity becomes larger to the extent that $\Delta I_{ASP}$ exceeds the upper limit of condition (6), manufacture of the lens element having the aspherical surface becomes difficult.

If the amount of asphericity becomes smaller to the extent that $\Delta I_{ASP}$ exceeds the lower limit of condition (6), the amount of the correcting of spherical aberration by the aspherical surface becomes smaller, so that the correcting of aspherical aberration cannot be made sufficiently.

Condition (7) specifies the amount of asphericity in the case where the negative fourth lens group 40 includes at least one aspherical surface. By satisfying this condition, distortion can be adequately corrected.

If the amount of asphericity becomes larger to the extent that $\Delta V_{ASP}$ exceeds the upper limit of condition (7), manufacture of the lens element having the aspherical surface becomes difficult.

If the amount of asphericity becomes smaller to the extent that $\Delta V_{ASP}$ exceeds the lower limit of condition (7), the amount of the correcting of distortion by the aspherical surface becomes smaller, so that the correcting of distortion cannot be made sufficiently.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, FNo designates the f-number, f designates the focal length of the entire zoom lens system, fB designates the back focal distance, W designates the half angle-of-view (°), r designates the radius of curvature, d designates the lens-element thickness or distance between lens elements, $N_d$ designates the refractive index of the d-line, and v designates the Abbe number.

In addition to the above, an aspherical surface which is symmetrical with respect to the optical axis is defined as follows:

$$x=cy^2/(1+[1-\{1+30\ K\}c^2y^2]^{1/2})+A4y^4+A6y^6+A8y^8+A10y^{10}\ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Furthermore, the relationship between the aspherical coefficients and aberration coefficients is discussed as follows:

1. The shape of an aspherical surface is defined as follows:

$$x = cy^2/(1+[1\{1-30\,K\}c^2y^2]^{1/2}) + A4y^4 + A6y^6 + A8y^8 + A10y^{10}\ldots$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

$B4 = A4 + Kc^3/8$;

$B6 = A6 + (K^2 + 2K)c^5/16$;

$B8 = A8 + 5(K^3 + 3K^2 + 3K)c^7/128$ $B10 = A10 + 7(K^4 + 4K^3 + 6K^2 + 4K)c^9/256$; and therefore, the following equation is obtained:

$$x = cy^2/[1+[1-c^2y^2]^{1/2}] + B4y^4 + B6y^6 + B8y^8 + B10y^{10} + \ldots$$

3. Furthermore, in order to normalize the focal length f to 1.0, the followings are considered:

$X = x/f$; $Y = y/f$; $C = f \cdot c$;

$\alpha 4 = f^3 B4$; $\alpha 6 = f^5 B6$; $\alpha 8 = f^7 B8$; $\alpha 10 = f^9 B10$ Accordingly, the following equation is obtained.

$$X = CY^2/[1+[1-C^2Y^2]^{1/2}] + \alpha 4 Y^4 + \alpha 6 Y^6 + \alpha 8 Y^8 + \alpha 10 Y^{10} + \ldots$$

4. $\Phi = 8(N'-N)\alpha 4$ is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient ($\alpha 4$) on each aberration coefficient is defined as:

$\Delta I = h^4 \Phi$ $\Delta II = h^3 k \Phi$ $\Delta III = h^2 k^2 \Phi$ $\Delta IV = h^2 k^2 \Phi$ $\Delta V = h k^3 \Phi$ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

Embodiment 1

FIGS. 1 through 6D show the first embodiment of the zoom lens system.

FIG. 1 is the lens arrangement of the zoom lens system according to the first embodiment, and Table 1 shows the numerical data thereof. FIGS. 2A through 2D show aberrations occurred in the zoom lens system shown in FIG. 1 at the short focal length extremity. FIGS. 3A through 3D show aberrations occurred in the zoom lens system shown in FIG. 1 at the intermediate focal length when the lens groups are moved along the lens-group moving paths shown in FIG. 20. FIGS. 4A through 4D show aberrations occurred in the zoom lens system shown in FIG. 1 at the long focal length extremity.

The designators f, W, fB, D4, D7 and D10 in Table 1 represent numerical data when the lens groups of the zoom lens system are moved according to the lens-group moving paths of FIG. 20.

Surface Nos. 1 through 4 represent the positive first lens group 10, surface Nos. 5 through 7 represent the negative second lens group 20, surface Nos. 8 through 10 represent the positive third lens group 30, surface Nos. 11 through 14 represent the negative fourth lens group 40. The diaphragm S is provided 1.69 mm behind (on the image side) the third lens group 30 (surface No. 10).

The positive first lens group 10 includes a negative meniscus lens element having the concave surface facing toward the object and a positive lens element, in this order from the object.

The negative second lens group 20 includes cemented lens elements having a biconcave negative lens element and a positive lens element, in this order from the object.

The positive third lens group 30 includes cemented lens elements having a negative meniscus lens element having the convex surface facing toward the object and a positive lens element, in this order from the object.

The negative fourth lens group 40 includes a positive lens element and a negative lens element, in this order from the object. on the other hand, FIGS. 5A through 5D show aberrations occurred in the zoom lens system shown in FIG. 1 at the first (before switching) intermediate focal length in the short-focal-length side zooming range ZW when the lens groups are moved along the lens-group moving paths shown in FIG. 19; and FIGS. 6A through 6D show aberrations occurred in the zoom lens system shown in FIG. 1 at the second (after switching) intermediate focal length in the long-focal-length side zooming range ZT when the lens groups are moved along the lens-group moving paths shown in FIG. 19.

Aberrations occurred in the zoom lens system, at the short focal length extremity (refer to FIGS. 2A thorough 2D) and the long focal length extremity (refer to FIGS. 4A thorough 4D), which is arranged to move along the lens-group moving paths of FIG. 19, are the same as those occurred in the zoom lens system which is arranged to move along the lens-group moving paths of FIG. 20.

The designators f, W, fB, D4, D7 and D10 in Table 2 represent numerical data, arranged in the order of fw−fm1− fm2–ft, when the lens groups of the zoom lens system are moved according to the lens-group moving paths of FIG. 19.

The negative second lens group 20 and the positive third lens group 30 maintain the predetermined distance d1 (=3.50 mm) in the short-focal-length side zooming range ZW, and maintains the shortened distance d2 (=0.50 mm) in the long-focal-length side zooming range ZT.

TABLE 1

| FNo = 1: | 5.8 | 10.6 | 12.5 | |
|---|---|---|---|---|
| f | 39.00 | 90.00 | 138.00 | (Zoom Ratio = 3.54) |
| W | 28.4 | 13.3 | 8.8 | |
| $f_B$ = | 9.08 | 38.60 | 56.12 | |
| D4 = | 2.70 | 11.40 | 16.50 | |
| D7 = | 3.50 | 3.00 | 0.50 | |
| D10 = | 14.61 | 5.91 | 4.20 | |

| Surf. No. | r | d | Nd | ν |
|---|---|---|---|---|
| 1 | −20.934 | 1.20 | 1.84666 | 23.8 |
| 2 | −30.388 | 0.10 | | |
| 3 | 35.358 | 3.10 | 1.48749 | 70.2 |
| 4 | −37.768 | D4 | | |
| 5 | −28.240 | 1.00 | 1.83481 | 42.7 |
| 6 | 12.194 | 2.80 | 1.80436 | 25.1 |
| 7 | 59.853 | D7 | | |
| 8 | 13.723 | 1.20 | 1.84666 | 23.8 |
| 9 | 9.658 | 4.20 | 1.58636 | 60.9 |
| 10* | −23.562 | D10 | | |
| 11* | 75.872 | 2.80 | 1.58547 | 29.9 |
| 12* | −74.976 | 4.60 | | |
| 13 | −9.783 | 1.75 | 1.72785 | 53.2 |
| 14 | −236.364 | — | | |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.77770 \times 10^{-4}$ | $-0.22882 \times 10^{-6}$ | — |
| 11 | 0.00 | $0.81605 \times 10^{-4}$ | $-0.15678 \times 10^{-5}$ | $0.14854 \times 10^{-7}$ |
| 12 | 0.00 | $-0.14505 \times 10^{-4}$ | $-0.11330 \times 10^{-5}$ | — |

TABLE 2

| FNo = 1: | 5.8 | 9.0 | 10.3 | 12.5 |
|---|---|---|---|---|
| f = | 39.00 | 70.00 | 110.00 | 138.00 |
| W = | 28.4 | 16.9 | 10.8 | 8.8 |
| $f_B$ = | 9.08 | 28.94 | 41.76 | 56.12 |
| D4 = | 2.70 | 7.50 | 15.00 | 16.50 |
| D7 = | 3.50 | 3.50 | 0.50 | 0.50 |
| D10 = | 14.61 | 7.88 | 5.93 | 4.20 |

Embodiment 2

FIGS. 7 through 12D show the second embodiment of the zoom lens system.

Figure 7:
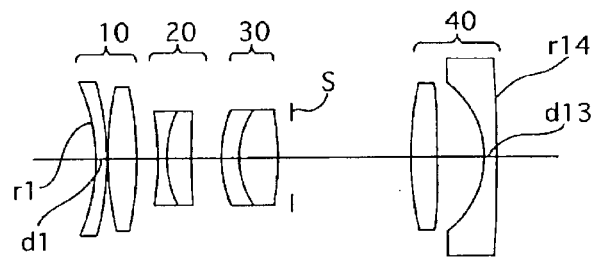
FIG. 7 is a lens arrangement of the zoom lens system according to a second embodiment of the present invention.
Figure 8A:
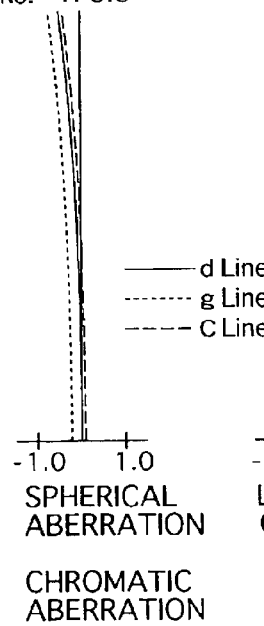
FIGS. 8A, 8B, 8C and 8D show aberrations occurred in the zoom lens system shown in FIG. 7 at the short focal length extremity.
Figure 8B:
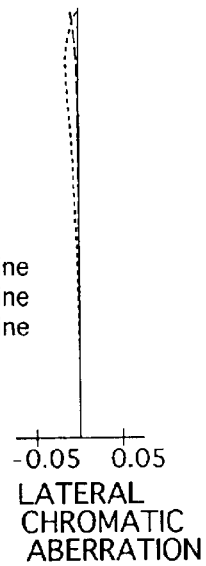
Figure 8C:
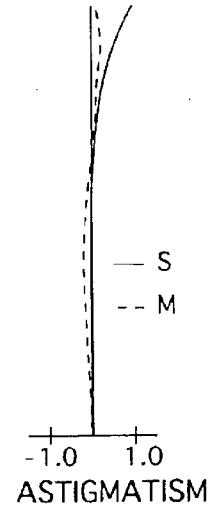
Figure 8D:
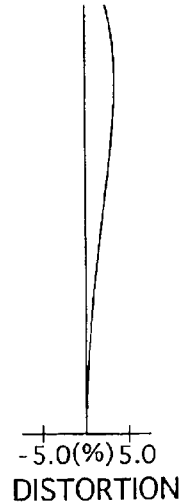

FIG. 7 is the lens arrangement of the zoom lens system according to the second embodiment, and Table 3 shows the numerical data thereof. FIGS. 8A through 8D show aberrations occurred in the zoom lens system shown in FIG. 7 at the short focal length extremity. FIGS. 9A through 9D show aberrations occurred in the zoom lens system shown in FIG. 7 at the intermediate focal length when the lens groups are moved along the lens-group moving paths shown in FIG. 20. FIGS. 10A through 10D show aberrations occurred in the zoom lens system shown in FIG. 7 at the long focal length extremity.

The designators f, W, $f_B$, D4, D7 and D10 in Table 3 represent numerical data when the lens groups of the zoom lens system are moved according to the lens-group moving, paths of FIG. 20.

The diaphragm S is provided 1.50 mm behind (on the image side) the third lens group 30 (surface No. 10).

On the other hand, FIGS. 11A through 11D show aberrations occurred in the zoom lens system shown in FIG. 7 at the first (before switching) intermediate focal length in the short-focal-length side zooming range ZW when the lens groups are moved along the lens-group moving paths shown in FIG. 19; and FIGS. 12A through 12D show aberrations occurred in the zoom lens system shown in FIG. 7 at the second (after switching) intermediate focal length in the long-focal-length side zooming range ZT when the lens groups are moved along the lens-group moving paths shown in FIG. 19.

Aberrations occurred in the zoom lens system, at the short focal length extremity (refer to FIGS. 8A thorough 8D) and the long focal length extremity (refer to FIGS. 10A thorough 10D), which is arranged to move along the lens-group moving paths of FIG. 19, are the same as those occurred in the zoom lens system which is arranged to move along the lens-group moving paths of FIG. 20.

The designators f, W, $f_B$, D4, D7 and D10 in Table 4 represent numerical data, arranged in the order of fw–fm1–fm2–ft, when the lens groups of the zoom lens system are moved according to the lens-group moving paths of FIG. 19.

The negative second lens group 20 and the positive third lens group 30 maintain the predetermined distance d1 (=3.30 mm) in the short-focal-length side zooming range ZW, and maintains the shortened distance d2 (=0.50 mm) in the long-focal-length side zooming range ZT.

TABLE 3

| FNo = 1: | 5.8 | 9.9 | 12.8 | |
|---|---|---|---|---|
| f | 39.00 | 90.00 | 140.00 | (Zoom Ratio = 3.59) |
| W | 28.5 | 13.2 | 8.6 | |
| $f_B$ = | 9.10 | 35.47 | 57.76 | |
| D4 = | 2.30 | 11.50 | 16.90 | |
| D7 = | 3.30 | 1.50 | 0.50 | |
| D10 = | 14.44 | 6.41 | 3.17 | |

| Surf. No. | r | d | Nd | ν |
|---|---|---|---|---|
| 1 | −20.490 | 1.20 | 1.84666 | 23.8 |
| 2 | −30.306 | 0.10 | | |
| 3 | 36.119 | 3.10 | 1.48749 | 70.2 |
| 4 | −36.119 | D4 | | |
| 5 | −31.225 | 1.00 | 1.88300 | 40.8 |
| 6 | 11.466 | 2.68 | 1.80518 | 25.4 |
| 7 | 74.351 | D7 | | |
| 8 | 13.341 | 1.93 | 1.84666 | 23.8 |
| 9 | 9.336 | 4.20 | 1.58636 | 60.9 |
| 10* | −25.111 | D10 | | |
| 11* | 43.284 | 2.80 | 1.58547 | 29.9 |
| 12* | −462.439 | 5.11 | | |
| 13 | −9.944 | 1.38 | 1.72916 | 54.7 |
| 14 | −182.688 | — | | |

*designates the aspherical surface which is rotationally symmetrical with respect to the optical axis.

Aspherical surface data (the aspherical surface coefficients not indicated are zero (0.00)):

| Surf. No. | K    | A4                      | A6                       | A8                      |
|-----------|------|-------------------------|--------------------------|-------------------------|
| 10        | 0.00 | $0.69652 \times 10^{-4}$ | $-0.12665 \times 10^{-6}$ | —                       |
| 11        | 0.00 | $0.59835 \times 10^{-4}$ | $-0.92890 \times 10^{-6}$ | $0.10123 \times 10^{-7}$ |
| 12        | 0.00 | $-0.20328 \times 10^{-4}$ | $-0.80651 \times 10^{-6}$ | —                       |

TABLE 4

| FNo = 1: | 5.8   | 9.5   | 10.4   | 12.8   |
|----------|-------|-------|--------|--------|
| f =      | 39.00 | 70.00 | 110.00 | 140.00 |
| W =      | 28.5  | 16.9  | 10.9   | 8.6    |
| $f_B$ =  | 9.10  | 28.00 | 42.02  | 57.76  |
| D4 =     | 2.30  | 9.50  | 15.50  | 16.90  |
| D7 =     | 3.30  | 3.30  | 0.50   | 0.50   |
| D10 =    | 14.44 | 6.96  | 5.07   | 3.17   |

Embodiment 3

FIGS. 13 through 18D show the third embodiment of the zoom lens system.

FIG. 13 is the lens arrangement of the zoom lens system according to the third embodiment, and Table 5 shows the numerical data thereof. FIGS. 14A through 14D show aberrations occurred in the zoom lens system shown in FIG. 13 at the short focal length extremity. FIGS. 15A through 15D show aberrations occurred in the zoom lens system shown in FIG. 13 at the intermediate focal length when the lens groups are moved along the lens-group moving paths shown in FIG. 20. FIGS. 16A through 16D show aberrations occurred in the zoom lens system shown in FIG. 13 at the long focal length extremity.

The designators f, W, $f_B$, D4, D7 and D10 in Table 5 represent numerical data when the lens groups of the zoom lens system are moved according to the lens-group moving paths of FIG. 20.

The diaphragm S is provided 1.66 mm behind (on the image side) the third lens group 30 (surface No. 10).

On the other hand, FIGS. 17A through 17D show aberrations occurred in the zoom lens system shown in FIG. 13 at the first (before switching) intermediate focal length in the short-focal-length side zooming range ZW when the lens groups are moved along the lens-group moving paths shown in FIG. 19; and FIGS. 18A through 18D show aberrations occurred in the zoom lens system shown in FIG. 13 at the second (after switching) intermediate focal length in the long-focal-length side zooming range ZT when the lens groups are moved along the lens-group moving paths shown in FIG. 19.

Aberrations occurred in the zoom lens system, at the short focal length extremity (refer to FIGS. 14A thorough 14D) and the long focal length extremity (refer to FIGS. 16A thorough 16D), which is arranged to move along the lens-group moving paths of FIG. 19, are the same as those occurred in the zoom lens system which is arranged to move along the lens-group moving paths of FIG. 20.

The designators f, W, $f_B$, D4, D7 and D10 in Table 6 represent numerical data, arranged in the order of fw–fm1–fm2–ft, when the lens groups of the zoom lens system are moved according to the lens-group moving paths of FIG. 19.

The negative second lens group 20 and the positive third lens group 30 maintain the predetermined distance d1 (=3.30 mm) in the short-focal-length side zooming range ZW, and maintains the shortened distance d2 (=0.30 mm) in the long-focal-length side zooming range ZT.

TABLE 5

| FNo = 1: | 5.8   | 9.5   | 12.5                       |
|----------|-------|-------|----------------------------|
| f        | 39.00 | 90.00 | 138.00 (Zoom Ratio = 3.54) |
| W        | 28.5  | 13.3  | 8.8                        |
| $f_B$ =  | 9.29  | 37.17 | 56.99                      |
| D4 =     | 2.26  | 12.17 | 15.99                      |
| D7 =     | 3.30  | 2.20  | 0.30                       |
| D10 =    | 14.95 | 6.14  | 4.22                       |

| Surf. No. | r        | d    | Nd      | ν    |
|-----------|----------|------|---------|------|
| 1         | −21.073  | 1.20 | 1.84666 | 23.8 |
| 2         | −30.778  | 0.10 |         |      |
| 3         | 35.359   | 3.10 | 1.48749 | 70.2 |
| 4         | −37.978  | D4   |         |      |
| 5         | −28.159  | 1.00 | 1.83481 | 42.7 |
| 6         | 11.038   | 2.80 | 1.80518 | 25.4 |
| 7         | 56.333   | D7   |         |      |
| 8         | 13.375   | 1.20 | 1.84666 | 23.8 |
| 9         | 9.165    | 4.20 | 1.58636 | 60.9 |
| 10*       | −23.493  | D10  |         |      |
| 11*       | 60.020   | 2.80 | 1.58547 | 29.9 |
| 12*       | −105.639 | 4.92 |         |      |
| 13        | −9.841   | 1.31 | 1.72916 | 54.7 |
| 14        | −149.853 | —    |         |      |

*designates the aspherical surface which is rotationally symmetrical with respect to the optical axis.

Aspherical surface data (the aspherical surface coefficients not indicated are zero (0.00)):

| Surf. No. | K    | A4                        | A6                        | A8                       |
|-----------|------|---------------------------|---------------------------|--------------------------|
| 10        | 0.00 | $0.70528 \times 10^{-4}$  | $-0.19227 \times 10^{-6}$ | —                        |
| 11        | 0.00 | $0.78954 \times 10^{-4}$  | $-0.13420 \times 10^{-5}$ | $0.12806 \times 10^{-7}$ |
| 12        | 0.00 | $-0.49690 \times 10^{-5}$ | $-0.10601 \times 10^{-5}$ | —                        |

TABLE 6

| FNo = 1: | 5.8   | 8.0   | 10.4   | 12.5   |
|----------|-------|-------|--------|--------|
| f =      | 39.00 | 70.00 | 110.00 | 138.00 |
| W =      | 28.5  | 16.9  | 10.8   | 8.8    |
| $f_B$ =  | 9.29  | 28.16 | 42.62  | 56.99  |
| D4 =     | 2.26  | 9.72  | 14.01  | 15.99  |
| D7 =     | 3.30  | 3.30  | 0.30   | 0.30   |
| D10 =    | 14.95 | 7.49  | 6.20   | 4.22   |

The numerical values of each embodiment for each condition are shown in Table 7.

TABLE 7

|               | Embodiment 1 | Embodiment 2 | Embodiment 3 |
|---------------|--------------|--------------|--------------|
| Condition (1) | 0.40         | 0.39         | 0.41         |
| Condition (2) | 0.08         | 0.07         | 0.08         |
| Condition (3) | 0.61         | 0.59         | 0.60         |
| Condition (4) | 13.42        | 13.54        | 13.48        |
| Condition (5) | 13.42        | 13.54        | 13.48        |
| Condition (6) | −27.78       | −24.31       | −26.24       |
| Condition (7) | 0.53         | 0.46         | 0.48         |

As can be understood from Table 7, the numerical values of the first through third embodiments satisfy conditions (1) through (7). Furthermore, as shown in the aberration diagrams, the various aberrations at each focal length are adequately corrected.

According to the above description, a zoom lens system, for a lens-shutter compact camera with a retractable lens barrel, having a zoom ratio Z (=fT/fW) of more than 3.5, can be achieved.

What is claimed is:

1. A zoom lens system comprising a positive first lens group, a negative second lens group, a positive third lens group, and a negative fourth lens group, in this order from an object, wherein zooming is performed by moving each of said positive first through said negative fourth lens groups along the optical axis;

wherein said zoom lens system satisfies the following condition:

$$0.35<(f_{23T}/f_{23W})/(f_T/f_W)<0.55$$

wherein $f_{23T}$ designates the combined focal length of said negative second lens group and said positive third lens group at the long focal length extremity;

$f_{23W}$ designates the combined focal length of said negative second lens group and said positive third lens group at the short focal length extremity;

$f_T$ designates the focal length of the entire the zoom lens system at the long focal length extremity; and $f_W$ designates the focal length of the entire the zoom lens system at the short focal length extremity.

2. The zoom lens system according to claim 1, satisfying the following condition:

$$0.05<(D_{23W}-D_{23T})/f<0.2$$

wherein $D_{23W}$ designates the axial distance between said negative second lens group and said positive third lens group at the short focal length extremity; and $D_{23T}$ designates the axial distance between said negative second and said positive third lens group at the long focal length extremity.

3. The zoom lens system according to claim 1, satisfying the following condition:

$$0.5<f_W/f_{1G}<0.7$$

wherein $f_{1G}$ designates the focal length of said positive first lens group.

4. The zoom lens system according to claim 1, satisfying the following condition:

$$12 \text{ mm}<f_{4G}(m_{4T}-m_{4W})/(f_T/f_W)<14 \text{ mm}$$

wherein $f_{4G}$ designates the focal length of said negative fourth lens group;

$m_{4T}$ designates the magnification of said negative fourth lens group when an object at an infinite distance is in an in-focus state at the long focal length extremity; and $m_{4W}$ designates the magnification of said negative fourth lens group when an object at an infinite distance is in an in-focus state at the short focal length extremity.

5. The zoom lens system according to claim 1, wherein said negative second lens group and said positive third lens group are arranged to maintain a predetermined distance d1 in a short-focal-length side zooming range which is defined between the short focal length extremity and a first intermediate focal length, and to maintain another predetermined distance d2, which is smaller than said predetermined distance d1, in a long-focal-length side zooming range which is defined between a second intermediate focal length and the long focal length extremity;

wherein at said first intermediate focal length, all of said lens groups are moved toward an image to said second intermediate focal length; and wherein said zoom lens system satisfies the following condition:

$$12 \text{ mm}<(X_{4W}+X_{4T}-\Delta X_{4MM^*})/(f_T/f_W)<14 \text{ mm}$$

wherein $X_{4W}=f_{4G}(m_{4M}-m_{4W})$;

$X_{4T}=f_{4G}(m_{4T}-m_{4M^*})$;

$\Delta X_{4MM^*}=f_{4G}(m_{4T}-m_{4M^*})$;

$m_{4H}=fm/f_{123M}$;

$m_{4W}=f_W/f_{123W}$;

$m_{4T}=f_T/f_{123T}$;

$m_{4M^*}=fm'/f_{123M^*}$;

fm designates said first intermediate focal length;

fm' designates said second intermediate focal length;

$f_{123W}$ designates the combined focal length of said positive first lens group, said negative second lens group and said positive third lens group at the short focal length extremity;

$f_{123M}$ designates the combined focal length of said positive first lens group, said negative second lens group and said positive third lens group at said first intermediate focal length in said short-focal-length side zooming range;

$f_{123M^*}$ designates the combined focal length of said positive first lens group, said negative second lens group and said positive third lens group at said second intermediate focal length in said long-focal-length side zooming range; and $f_{123T}$ designates the combined focal length of said positive first lens group, said negative second lens group and said positive third lens group at the long focal length extremity.

6. The zoom lens system according to claim 1, wherein said positive third lens group comprises at least one aspherical surface that satisfies the following condition:

$$-30<\Delta I_{ASP}<-10$$

wherein $\Delta I_{ASP}$ designates the amount of change of the spherical aberration coefficient due to said aspherical surface in said positive third lens group under the condition that the focal length at the short focal length extremity is converted to 1.0.

7. The zoom lens system according to claim 1, wherein said negative fourth lens group comprises at least one aspherical surface that satisfies the following condition:

$$0<\Delta V_{ASP}<3$$

wherein $\Delta V_{ASP}$ designates the amount of change of the distortion coefficient due to said aspherical surface in said negative fourth lens group under the condition that the focal length at the short focal length extremity is converted to 1.0.

* * * * *